Oct. 13, 1931.  A. H. ADAMS  1,826,710
APPARATUS FOR SOLDERING
Original Filed Nov. 19, 1927
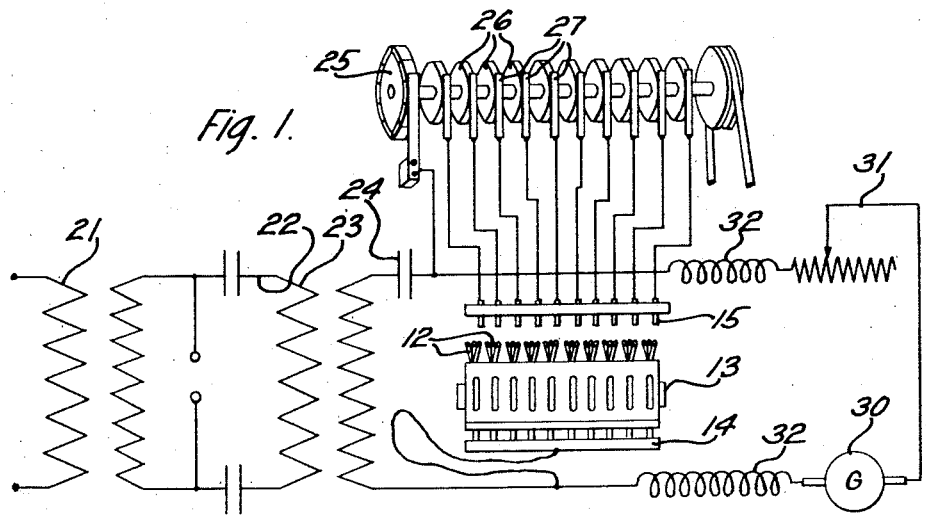
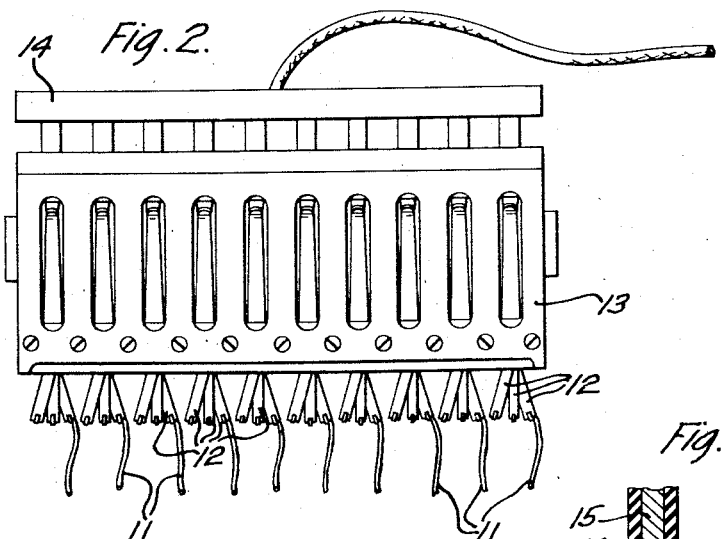
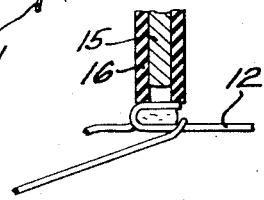
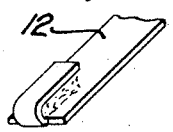
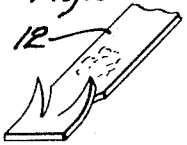
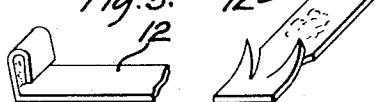
Inventor
A. H. Adams
By H.B. Whitfield Att'y.

Patented Oct. 13, 1931

1,826,710

UNITED STATES PATENT OFFICE

ARTHUR H. ADAMS, OF NEW YORK, N. Y., ASSIGNOR TO WESTERN ELECTRIC COMPANY, INCORPORATED, OF NEW YORK, N. Y., A CORPORATION OF NEW YORK

APPARATUS FOR SOLDERING

Original application filed November 19, 1927, Serial No. 234,362. Divided and this application filed July 15, 1930. Serial No. 468,159.

This invention relates to apparatus for soldering, and more particularly to apparatus for soldering with a low tension arc, and is a division of my copending application Serial No. 234,362, filed November 19, 1927.

Objects of the invention are to provide an effective and efficient apparatus for producing soldered parts at an increased rate of output.

In accordance with the general features of the invention, a part to be soldered is provided with a particle of solder and the part itself is used as an electrode. When the part to be joined thereto has been located in position an electrode is brought into such proximity to the parts as to permit a high potential, high frequency source of electrical energy to produce an arc and thus to ionize the gap, whereupon the energy required for the soldering operation will be supplied from a low tension direct current source across the ionized gap. In accordance with one embodiment of the invention, particles of solder are applied to a plurality of parts which are then associated with other parts and sequentially soldered.

It is believed that a complete understanding of the invention may be had by reference to the following description taken in conjunction with the accompanying drawings, in which Fig. 1 is a diagrammatic illustration of the circuit connections of a soldering apparatus embodying the invention;

Fig. 2 is a plan view of a multiple telephone jack whose terminals are to be provided with lead wires and a multiple plug which simultaneously connects all of the terminals to the soldering circuit;

Fig. 3 is a cross sectional view of an electrode showing it in operative position on a terminal, and Figs. 4, 5 and 6 illustrate different types of terminal members adapted to be used in connection with the soldering apparatus disclosed.

Referring to the drawings in which the same reference characters designate similar parts in the several views, the invention is illustrated in connection with the soldering of lead wires 11 to terminal members 12 of a multiple telephone jack 13. The terminal members 12 may be provided with overlapped portions at their ends, as shown in Figs. 4 and 5, which upon dipping the ends in a bath of molten solder will cause a particle of the solder to adhere between the overlapped portions or the ends may be provided with partially severed portions which are bent upwardly and solder applied thereto by dropping a hot particle of the solder near the end. Contact is made with all of the terminal members simultaneously by a multiple plug 14 which connects all of the terminal members with the soldering circuit. Each terminal member will thus form an electrode which is associated with another electrode 15 in the soldering operation. The welding electrode 15 is surrounded by an insulating tube 16 preferably of quartz which extends beyond the end of the electrode leaving a cylindrical cavity which completely encloses the arc when the tube and the electrode are in operative relation to a part as shown in Fig. 3, thereby reducing the oxidizing effect which would result from an unenclosed arc being directed upon a metallic part and retaining the ionized gases to form a low resistance path after the arc has been started.

In order that a low tension direct current arc may be used to supply the soldering energy and to prevent the formation of a crater which results when the electrode is contacted with the part to start an arc, a high frequency source of energy is provided to ionize the path of the arc, permitting a low tension direct current to maintain the arc during the soldering operation.

The high frequency current may be obtained from a transformer 21 which is connected to any suitable source of alternating current (not shown) of commercial frequency. The secondary of the transformer is connected to a tuned high frequency circuit 22 which is provided with a spark gap adjusted so as to break down just before the voltage of the transformer 22 reaches its maximum value, producing high frequency oscillations in the tuned circuit 22, as well known in the art. The high frequency alternations of the circuit 22 are transmitted to the electrodes through a transformer 23 which forms a part of tne tuned circuit 22. One side of the secondary of the transformer 23 is electrically connected to the terminal members 12 through the multiple plug 14, while the other side leads through a condenser 24 to a commutator 25 having a plurality of segments, each one of which is connected to one of the slip rings 26. A brush 27 contacts with each of the slip rings 26 and connects it to one of the electrodes 15. It will thus be seen that, as the commutator and the slip rings are rotated by any suitable source of power (not shown) the electrodes 15 will be sequentially connected to the source of high frequency alternations.

The direct current soldering energy is supplied from a generator 30 and passes through a rheostat 31 and a pair of inductance coils 32. The direct current circuit is connected at one side of the multiple plug 14 and at the other side to the commutator 25 from which points it follows the same path as the high frequency circuit. The inductance coils 32 prevent the high frequency current from flowing over the direct current circuit and the condenser 24 prevents the direct current from flowing over the high frequency circuit so that each of the circuits will function independently.

When the apparatus is used for soldering leads to the terminal members of a telephone jack the terminals are first dipped in a bath of molten solder causing a particle of solder to adhere under each of the overlapped portions on the ends of the terminal members. When the terminal members have been thus prepared, the multiple plug 14 is inserted in the jack connecting each of the terminal members to one side of the soldering circuit. The electrodes 15 are then brought into contact with a plurality of the terminal members and a lead wire is associated with each of the terminal members and placed under a slight tension to draw the lead into the solder as it is melted. A suitable flux in the form of a paste or a thick liquid may be applied to the parts to be soldered and on account of the presence of the arc it is desirable to use a non-inflammable flux, as for instance a flux consisting of resin dissolved in carbon tetrachloride in the proportion of .7 pounds of resin in a gallon of carbon tetrachloride. As the commutator 25 is slowly rotated, the high frequency source of current will sequentially start the arc across the gaps between the electrodes 15 and the terminal members 12 and as soon as the arc is started the soldering current will flow to effect the soldering of the associated parts as described above. The time during which the soldering current is applied may be conveniently regulated by varying the speed of rotation of the commutator 25.

It will be understood that the embodiment of the invention herein described and illustrated is merely a convenient and useful form of the invention which is capable of many other modifications without departing from the spirit and scope of the invention.

What is claimed is:

1. In a soldering apparatus, means for connecting a part to be soldered in a soldering circuit, an enclosed electrode adapted to enclose an arc between the part and the electrode, a source of high voltage high frequency oscillations to start an arc, and a low tension source of current to supply the soldering energy.

2. In a soldering apparatus, means for connecting a plurality of parts in a soldering circuit, a plurality of electrodes, each of which is adapted to be associated with a part, a source of soldering energy, and a commutator for sequentially connecting the electrodes to the source of energy.

3. In a soldering apparatus, means for positioning a plurality of parts in spaced relation, means for connecting the parts in parallel in a soldering circuit, a plurality of electrodes positioned in spaced relation to coact with the respective parts, means for simultaneously impressing a high voltage high frequency current and a direct current on the soldering circuit, and means for successively including the electrodes in the circuit for predetermined intervals.

4. In a soldering apparatus, a soldering circuit, means for simultaneously impressing a high voltage high frequency current and a direct current on the circuit, a plurality of electrodes positioned in spaced relation, means for positioning a plurality of parts in spaced relation to coact with the electrodes, means for connecting said parts in the circuit, and rotary means for successively including the electrodes in the circuit for predetermined intervals.

5. In a soldering apparatus, a soldering circuit, means for impressing a high voltage high frequency current on the circuit, means for simultaneously impressing a direct current on the circuit, a condenser connected in series with the first mentioned means for preventing the flow of direct current therethrough, and inductive means connected in series with the second mentioned means for preventing the flow of high frequency current therethrough.

6. In a soldering apparatus, a soldering circuit, means for impressing a high voltage high frequency current on the circuit, means for simultaneously impressing a direct current on the circuit, a condenser connected in series with the first mentioned means for preventing the flow of direct current therethrough, inductive means connected in series with the second mentioned means for preventing the flow of high frequency current therethrough, a plurality of electrodes positioned in spaced relation, and means for successively including the electrodes in the soldering circuit for predetermined intervals.

In witness whereof, I hereunto subscribe my name this 10th day of July A. D., 1930.

ARTHUR H. ADAMS.